United States Patent Office 3,005,760
Patented Oct. 24, 1961

3,005,760
METHOD OF OPPOSING IRRADIATION-INDUCED VISCOSITY INCREASE IN EMPLOYMENT OF ORGANIC FLUIDS
Robert O. Bolt, San Rafael, Calif., assignor, by mesne assignments, to the United States of America as represented by the United States Atomic Energy Commission
No Drawing. Filed Jan. 27, 1956, Ser. No. 561,963
1 Claim. (Cl. 204—154.2)

The present invention relates in general to operations wherein fluid organic substances are subjected to nuclear reactor irradiation deleterious to their fluidity, and more particularly to an improved method for opposing and avoiding viscosity increase and general thickening of organic fluids, and especially of lubricating oils, upon exposure to such radiation.

Fundamental theory, details of construction, and principles of operation of the nuclear reactor are now widely known in the art, as are modes of its application as a radically advanced ultimate heat source for power plants. For such details, reference may be made to:

"Principles of Nuclear Reactor Engineering," Glasstone, 1955, Van Nostrand;
"The Reactor Handbook," vols. 1, 2, and 3, United States Atomic Energy Commission, 1955 (AECD-3645, AECD-3646, AECD-3647);
"The Elements of Nuclear Reactor Theory," Glasstone and Edlund, 1952, Van Nostrand;
U.S. Patent 2,708,656, issued May 17, 1955, in the name of E. Fermi et al., for Neutronic Reactor;

and co-pending applications of the common assignee:

S.N. 321,078, filed November 18, 1952, now U.S. Patent 2,945,794 issued July 19, 1960, in the names of C. E. Winters, C. B. Graham, J. S. Culver and R. H. Wilson, for Improved Neutronic Reactor Operational Method and Core System;
S.N. 355,262, filed May 15, 1953, now U.S. Patent 2,938,844, issued May 31, 1960, in the names of C. B. Graham and I. Spiewak, for Improved Neutronic Reactor Control Method and System; and
S.N. 389,182, filed October 29, 1953, in the names of W. B. Thomson and A. Corbin, Jr., for Neutronic Reactor Core.

Characteristically, the operation of a nuclear reactor is attended by the continuous emanation in all directions of radiations of various types—principally neutrons, gamma rays, and alpha and beta particles—of energies ranging to high intensities and in great flux densities. Among these, neutron and gamma rays are, by far, of the greater consequence; while the alpha and beta radiations, being charged particles, are mostly stopped upon encountering merely a few millimeters of any intervening solid material, the neutrons and gammas are exceedingly more penetrating, and thus generally bombard and permeate all unshielded surrounding environment of the reactor. Representative of the spectra of neutron and gamma radiation emanated from reactors of contemporary design for research and for stationary steam-electric power generation, are the data presented in Table I following:

TABLE I

*Typical neutron and gamma radiation spectrum emanated from operating neutronic reactor [1] (approximate)*

| Neutrons | | Gamma Rays | |
|---|---|---|---|
| Total Flux=ca. $1\times10^{10}$ neutrons/cm.$^2$/sec. | | Total Flux=ca. 5,000 Roentgens/hr. | |
| Energy Range | Percentage of Neutrons | Energy Range | Percentage of Photons |
| 8 to 0.5 Mev.[2] | 10 | ca. 8 Mev | 20 |
| 0.5 Mev. to 0.025 ev | 90 | ca. 3-2 Mev | 30 |
| | | ca. 1 Mev | 50 |

[1] For bare thermal reactor; graphite moderated; air cooled.
[2] Million electron volts.

For reactors operating at higher generated power densities, especially, the more compact mobile reactor designs for aircraft and ship propulsion, the levels of the total flux emanated tend to range from 1 to 3 orders of magnitude higher than those outlined in Table I, although the relative distribution of radiation throughout this spectrum is usually not greatly different; the levels of flux within the hearts of the reactor cores themselves tend to be another 1 or 2 orders of magnitude greater than those indicated to be emanated from the surface.

Effective operation of reactors and the derivation of useful nuclear power therefrom often require the use, in the intensely radioactive environment of the reactor core, of fluid organic compounds for functions depending primarily upon fluidity. Such materials prominently include lubricants, as well as power transmission fluids, heat transfer fluids and the like. For example, in designs for aircraft propulsion application, where a reactor would simply be substituted, in place of fuel combustion units, to serve to heat the air in an enlarged version of a conventional turbo-jet engine, the main bearings of the compressor-turbine rotor and their lubricant may be located within a foot or so of the reactor core, and in such position would be exposed to the full fury of the virtually unimpeded radiations emanated from the reactor core. Likewise in other mobile and stationary applications wherein, for extracting the generated heat from the reactor, a stream of liquid coolant, such as water, aqueous solutions, molten salts, molten metals, and the like, is flowed in heat-transfer relationship therethrough, the liquid-circulating pumps, their bearings, and their lubricants are similarly disposed in close proximity to the reactor core, and thus may sustain intense bombardment by radiation therefrom. In the same manner, power transmission fluids, heat-transfer fluids, hydraulic fluids, lubricants for control rod drive motors and linkages integrally associated with the reactor core, all disposed within or in close proximity to the reactor core, and lubricants for bearings and moving parts of somewhat more remote entities of nuclear power production plants, are similarly subjected, to greater or lesser degrees, to irradiation by the reactor.

However, it has become apparent that, as a general rule, nuclear reactor irradiation deleteriously reduces the fluidity of organic compounds, often to the extent of complete solidification in a very short time. This is notable in the case of liquid hydrocarbons which include, to a large measure, the variety of oils normally adapted to serve as efficacious lubricants and other such functional liquids in non-radioactive environments. For example, a sample of a representative conventional commercial petroleum hydrocarbon lubricating oil—i.e., paraffinic, solvent-refined, Western (United States) automotive oil, SAE–30—upon irradiation for four weeks in a graphite-moderated thermal nuclear reactor thickened from its original viscosity range of medium-weight automotive oil to virtually a solid. In that instance, the approximated cumulative radiation dosage sustained amounted to ca. $1.7 \times 10^{18}$ neutrons per square centimeter and a proportionate dosage of gamma radiation; significantly, this represents approximately the same accumulated radiation dosage, and thus expectedly much the same radiation damage to the lubricant, that would be sustained in a typical design of aircraft-propulsion reactor, operating at a radiation flux intensity level about two orders of magnitude greater, in so short time as only six to seven hours. (For a matter of definition, the approximated quantitative value of cumulative neutron dosage, as set forth immediately above and at other points hereinafter throughout the specification, refers to the computed product of the measured neutron flux into which the sample is inserted in units of neutrons/square centimeter/second and the measured duration of time, in units of seconds, throughout which the sample remains so inserted. Although it is true that the very presence in the neutron flux of the sample itself, which is not totally transparent to neutrons but effects some absorption thereof, results in the total flux being lower in the presence than in the absence of the sample, nevertheless in view of the small sample volumes generally employed and the relatively low neutron absorptivity of component atoms of the particular oils and their containers, the computed product approaches quite closely the actual dosage sustained at any given square centimeter area within the sample.) Moreover, upon a somewhat longer irradiation of five weeks (cumulative dosage=$1.94 \times 10^{18}$ neutrons per square centimeter), the same SAE–30 oil became altogether solid. In only two weeks irradiation, the same oil, as well as SAE–30 oils derived from various other principal petroleum crudes, all thickened to a pasty gum. Likewise, oils other than petroleum fractions—e.g., alkyl aromatic compounds, esters, halocarbons, ketones, alcohols, and silicones—are found generally to thicken in a similar fashion upon reactor irradiation.

Naturally, such inordinate irradiation thickening is a hindrance to the successful design of nuclear power plants. Not only does it interfere with the essential functions of the oils, but remedial resort to continual disposal and replacement of thickened radiation-exposed oils with a supply of fresh fluid is detractive from economy of operation; in the case of mobile reactor systems, the requisite supply of fresh fluid may impose a serious penalty in volume and weight. Consequently, there has been an increasing desire that new, effective means be found toward overcoming and avoiding this radiation-thickening difficulty, and thus affording more practical application of such organic liquids for functional services where exposed to the radiation of operating nuclear reactors.

Accordingly, one object of the present invention is to provide a new and improved method for conducting operations utilizing an essentially fluid organic substance under circumstances where the substance is subjected to nuclear reactor irradiation deleterious to its fluidity during operation.

Another object is to provide such a method which is simply effectible, and which affords substantial opposition and avoidance to the deleterious effects of irradiation upon fluidity.

A further object is to provide such a method especially applicable where said operation is lubrication.

Still another object is to provide a new and improved method for the lubrication of a system with a lubricant being subjected therein to nuclear reactor irradiation deleterious to its lubricating efficacy.

Additional objects will become apparent hereinafter.

In accordance with the present invention, in an operation utilizing a fluid organic substance, the efficacy of which is dependent essentially upon the fluidity thereof, wherein the substance sustains nuclear reactor irradiation deleterious to said fluidity, the deleterious effects of the irradiation upon fluidity are resisted and opposed by employing as said substance a fluid, saturated, long-chain aliphatic compound having integrally incorporated, in a central portion of the long chain, a plurality of thioether and a plurality of ether linkages no two of which are linked to the same carbon atom. Particularly desired for said central portion is a structure comprising two thioether linkages and two ether linkages individually spaced between successive ethylene radicals, as:

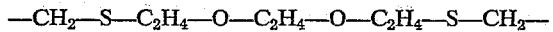

which, comprising twelve atoms linearly, is in itself a long-chain array. Applicant has discovered that material of such central structure is extraordinary, among organic compounds generally, in that an actual increase in fluidity has been found to result upon exposure to reactor irradiation, with the resulting enhanced fluidity being retained throughout the course of continued irradiation of a practicable duration. In more detail, it has been noted in the case of a preferred species of the present ether-thioether composition, having an original viscosity approximating medium-weight automotive oil, that when it was subjected to much the same intensity of nuclear reactor irradiation as was mentioned hereinbefore, it progressively decreased somewhat in viscosity to the range of light turbine oil and heavy textile spindle oil and remained in this more fluid range throughout the completion of five weeks of irradiation (the approximate period wherein the SAE–30 petroleum oil of about the same initial viscosity thickened all the way to solidification). Furthermore, inasmuch as the present ether-thioether oil is otherwise amenable to affording effective lubrication, such application of the same comprises, in accordance with the present invention, an improved method for the lubrication of a system with a lubricant being subjected therein to deleterious reactor irradiation. Being of such efficacy, and having such beneficial attributes, the present method clearly affords substantial practical advantages in applications of functional fluids to nuclear power plants.

Considering the operation of applicant's method more particularly, the species of ether-thioether oil suitable for the present radiation-resistant service are, in accordance with the present invention, subject to considerable variation. Among various saturated long-chain aliphatic compounds containing the requisite central ether-thioether structure, those predominantly straight-chained—or, better, wholly straight-chained—are preferred. A principal chain length comprising about two dozen carbon atoms is ordinarily suitable to provide a proper oil consistency of the material; inasmuch as initial viscosity ordinarily increases monotonically with chain length in each homologous series, a compound of chain length appropriate to afford a viscosity suitable for the confronting application may conveniently be selected. Concerning the central structure, merely two thioether and two ether linkages normally constitute an adequate number of both to afford suitable opposition to thickening under irradiation, while not including so many additional linkages as to chance extra large decreases in viscosity upon exposure to the reactor flux. Individual spacing of the oxygen and sulfur atoms of the respective ether and thioether linkages between short, saturated, plural-carbon paraffinic radicals is in order. Eminently meeting the foregoing desiderata, the compound 16,19-dioxa-13,22-dithiatetratriacontane having the following structural formula:

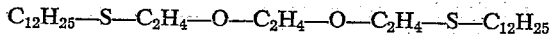

is the particularly preferred species, especially inasmuch as it exhibits an initial viscosity (100° F.) approximating 50 to 60 centistokes, which beneficially decreases to a level of the order of 20 to 30 centistokes under substantial reactor irradiation—a viscosity range of particular interest for aircraft gas turbine lubrication.

In operation, it is ordinarily desirable to select an initial ether-thioether oil somewhat more viscous than the optimum for the particular application, so that the lower viscosity level to which the oil thins under irradiation will be proper for the desired service. Inasmuch as many operations are sufficiently non-sensitive to viscosity as to admit of use of an oil which is, say, 25 to 35 centistoke units more viscous than optimum for occasional periods, it is often satisfactory merely to apply the thio-ether-ether oil in its initial more viscous condition straightforwardly to the particular service under irradiation—as a lubricant, hydraulic fluid, heat transfer fluid, power transmission fluid or the like—and thereupon simply permit the viscosity to thin down to the optimum level while in actual service.

In more viscosity-sensitive applications, it becomes appropriate to provide a pretreatment reservoir or sump for retaining the fresh oil quiescently exposed to the reactor radiation flux where it may be subjected to a sufficient radiation dosage (say of the order of 3 to $4 \times 10^{17}$ neutrons per square centimeter) for reduction of its viscosity to the optimum operating level before passing it along to replace spent oil in the desired service.

It is thought that the mechanism effective in the decrease in viscosity of the present ether-thioether material under reactor irradiation may be principally one of radiation-induced rupture of the thioether and ether linkages resulting in roughly halved aliphatic chain-lengths, which are generally characterized by a much lower viscosity. It is possible that the susceptibility of such linkages for rupture substantially outweighs any affinity of the ruptured linkages for re-uniting to form more complex organic structures of greater viscosity, and thus serves to offset probable irradiation-promoted polymerization among the hydrocarbon portions of the compounds to which effect the general thickening as likely ascribable.

The presence of multiple linkages in the initial compound may be surmised to afford repetitive rupture of such polymers as they develop, thereby permitting the viscosity to remain at least temporarily at a more or less fixed lowered level in the course of the irradiation. However, it is not intended that this invention be limited to any particular theory concerning the manners of interaction of the present materials with the nuclear radiation through which the demonstrated benefits derive.

Further illustration of quantitative aspects of the present method is provided in the following specific example. In the example, the effect of reactor irradiation upon viscosity of the present ether-thioether material is compared with that of a wide variety of other organic oils.

EXAMPLE

A series of samples of a variety of oils suitable for lubrication service, including ether-thioether material, of different exemplary types and of different viscosities representative of ranges generally useful for applications in nuclear power plants, where assembled. Samples of each species of fluid were divided into a number of smaller quantities. One portion of each was retained in original condition for viscosity measurement. Other of the portions so obtained were introduced, in substantially identical quantity (ca. 7 milliliters), into respective small transparent fused quartz ampoules of ca. 10 to 17 milliliters internal volume, having a wall thickness of approximately one millimeter, and provided in the top with a ca. 5 millimeters diameter vent hole. Each ampoule was disposed vertically in a vertical right cylindrical 2S aluminum can, 0.75-inch internal diameter x 2.875 inches internal height, of 0.035-inch wall thickness, completely closed except for a No. 50 drill hole in its top. The ampoule-containing cans were thereupon inserted and disposed directly within the core of an operating graphite-moderated thermal nuclear reactor in positions wherein the radiation flux intensity approximated $0.5 \times 10^{12}$ to $1 \times 10^{12}$ neutrons per square centimeter per second, and $2 \times 10^5$ to $5 \times 10^5$ roentgens per hour in

TABLE II

*Effect of neutronic reactor irradiation upon viscosity of organic fluids*

| Identity | $\Theta_1$[a] (Weeks) | $\Theta_2$[b] (hrs.) | Neutron[c] Dosage $\times 10^{-18}$ (n./cm.²) | Temp. (ave.) (° C.) | Viscosity (centistokes) | | | |
|---|---|---|---|---|---|---|---|---|
| | | | | | at 100° F. | | at 210° F. | |
| | | | | | Orig. | Irrad. | Orig. | Irrad. |
| Ether-Thioether Oil: | | | | | | | | |
| 16,19-dioxa-13,22-dithiatetratriacontane | 1 | 2 | 0.45 | 68 | 53.8 | 27.9 | 7.2 | 5.2 |
| | 2 | 2½ | 0.60 | 74 | 53.8 | 20.3 | 7.2 | 4.4 |
| | 4 | 7 | 1.80 | 68 | 53.8 | 26.9 | 7.2 | 4.9 |
| | 5 | 8 | 1.97 | 68 | 53.8 | 19.7 | 7.2 | 4.0 |
| Comparative Damage to Other Oils: | | | | | | | | |
| Petroleum Oils— | | | | | | | | |
| Paraffinic, solvent-refined Western (U.S.) petroleum lubricating oil (SAE-30) | 1 | ½ | 0.15 | 46 | 118 | 160 | 11.5 | 13.8 |
| | 1 | 2 | 0.45 | 20 | 118 | 220 | 11.3 | 17.4 |
| | 1 | 2 | 0.44 | 80 | 117 | 251 | 11.4 | 19.1 |
| | 2 | 2½ | 0.59 | 73 | 117 | 477 | 11.4 | 29.2 |
| | 4 | 3 | 0.76 | 46 | 118 | broken | 11.3 | broken |
| | 2 | 4 | 0.94 | 78 | 124 | 1312 | 11.5 | 48.0 |
| | 2 | 4 | 0.94 | 78 | 124 | 1300 | 11.7 | 43.4 |
| | 4 | 4½ | 1.14 | 80 | 117 | 1355 | 11.4 | 60.0 |
| | 4 | 7 | 1.70 | 20 | 118 | too viscous | 11.3 | too viscous |
| | 5 | 8 | 1.94 | 67 | 117 | solid | 11.4 | solid |
| Refined Middle-East Petroleum Lubricating Oil (SAE-30) | 2 | 4 | 0.94 | 77 | 115 | 717 | 11.7 | 29.6 |
| | 2 | 3½ | 0.92 | 77 | 115 | 1198 | 11.7 | 57.6 |
| Refined Pennsylvania Petroleum Lubricating Oil (SAE-30) | 2 | 3½ | 0.92 | 76 | 117 | 1450 | 12.3 | 89.0 |
| | 2 | 3½ | 0.92 | 77 | 117 | 1500 | 12.3 | 100.0 |
| Naphthenic Solvent-Refined Western (U.S.) Petroleum Lubricating Oil (SAE-30) | 2 | 3½ | 0.91 | 75 | 126 | 845 | 9.5 | 29.1 |
| | 2 | 3½ | 0.92 | 76 | 126 | 930 | 9.5 | 31.4 |
| Paraffinic Solvent-Refined Western (U.S.) Petroleum Lubricating Oil (150-N) | 1 | 1½ | 0.42 | 61 | 31.9 | 68.9 | 5.1 | 8.0 |
| | 4 | 6½ | 1.60 | 61 | 31.9 | 2380 | 5.1 | 93.0 |
| Upgraded Paraffinic Solvent-Refined Western (U.S.) Petroleum Lubricating Oil (150-N) | 1 | 1½ | 0.34 | 69 | 17.6 | 32.0 | 3.9 | 5.9 |
| | 4 | 6 | 1.45 | 69 | 17.5 | 558 | 3.8 | 50.2 |
| Highly-Refined Western (U.S.) Napthenic Petroleum Distillate | 1 | 1½ | 0.34 | 65 | 2.9 | 4.3 | 1.1 | 1.4 |
| | 4 | 5½ | 1.36 | 65 | 2.9 | 24.8 | 1.1 | 4.1 |
| Naphthenic Highly-Refined Western (U.S.) White Oil | 2 | 3½ | 0.91 | 74 | 73.8 | 2160 | 7.6 | 50.6 |
| | 2 | 3½ | 0.91 | 74 | 73.8 | 2590 | 7.6 | 55.4 |

See footnotes at end of table.

TABLE II—Continued

*Effect of neutronic irradiation upon viscosity of organic fluids—Continued*

| Identity | $\Theta_1$[a] (Weeks) | $\Theta_2$[b] (hrs.) | Neutron[c] Dosage ×10⁻¹⁸ (n./cm.²) | Temp. (ave.) (°C.) | Viscosity (centistokes) at 100° F. Orig. | at 100° F. Irrad. | at 210° F. Orig. | at 210° F. Irrad. |
|---|---|---|---|---|---|---|---|---|
| Aliphatic Compounds: | | | | | | | | |
| n-hexadecane (cetane) | 1 | 1½ | 0.34 | 69 | 3.1 | 4.4 | 1.2 | 1.5 |
|  | 4 | 5½ | 1.41 | 67 | 3.1 | 21.2 | 1.2 | 4.7 |
|  | 4 | 7½ | 1.80 | 140 | 3.1 | 62.6 | 1.2 | 11.3 |
| 1-dodecene | 2 | 4 | 0.95 | 68 | 1.4 | solid | 1.1 | solid |
| Alkyl Aromatics: | | | | | | | | |
| Alkylbenzene (M.W.=250)[d] | 1 | 1½ | 0.35 | 66 | 6.3 | 8.3 | 1.7 | 2.1 |
|  | 1 | 1½ | 0.38 | 77 | 6.1 | 8.0 | 1.7 | 2.0 |
|  | 1 | 1½ | 0.41 | 60 | 6.1 | 9.1 | 1.7 | 2.1 |
|  | 4 | 5½ | 1.36 | 66 | 6.3 | 21.3 | 1.7 | 3.4 |
|  | 4 | 6½ | 1.60 | 60 | 6.1 | 25.9 | 1.7 | 3.9 |
|  | 4 | 7 | 1.70 | 78 | 6.1 | 27.2 | 1.7 | 4.0 |
|  | 4 | 7 | 1.80 | 140 | 6.3 | 34.5 | 1.7 | 4.7 |
|  | 4 | 7 | 1.73 | 180 | 6.4 | 92.0 | 1.8 | 7.7 |
|  | 4 | 7 | 1.79 | 220 | 6.4 | Empty | 1.8 | Empty |
|  | [c] 2 | 2½ | 0.58 | 71 | 6.4 | 9.7 | 1.8 | 2.3 |
|  | [e] 5 | 7½ | 1.89 | 66 | 6.4 | 41.2 | 1.8 | 5.3 |
| Alkylbenzene (M.W.=350)[f] | 1 | 1½ | 0.37 | 63 | 84.0 | 122.0 | 6.7 | 8.3 |
|  | 1 | 1½ | 0.42 | 130 | 101 | 132 | 7.1 | 8.6 |
|  | 2 | 3½ | 0.83 | 130 | 101 | 204 | 7.1 | 11.9 |
|  | 2½ | 4 | 0.96 | 134 | 101 | 292 | 7.1 | 8.2 |
|  | 2½ | 4 | 0.96 | 134 | 101 | 305 | 7.1 | 15.3 |
|  | 3 | 5 | 1.2 | 129 | 101 | 399 | 7.1 | 16.2 |
|  | 4 | 6 | 1.44 | 63 | 84.0 | 700 | 6.7 | 22.6 |
|  | 4 | 6½ | 1.6 | 129 | 101 | 816 | 7.1 | 24.4 |
|  | 5 | 8 | 2.0 | 127 | 101 | 1520 | 7.1 | 35.3 |
|  | 6 | 9½ | 2.4 | 127 | 101 | 4720 | 7.1 | 68.5 |
|  | 4 | 7 | 1.79 | 220 | 121 | solid | 8.1 | solid |
| Octadecylbenzene | [e] 1 | 1½ | 0.39 | 76 | 11.0 | 15.5 | 2.8 | 3.6 |
|  | [e] 4 | 6 | 1.46 | 129 | 11.0 | 127 | 2.8 | 11.8 |
|  | 26 | 39 | 9.68 | 70 | 11.0 | solid | 2.8 | solid |
| Amylbiphenyl | 2 | 2 | 0.56 | 67 | 10.6 | 15.8 | 2.2 | 2.8 |
|  | 5 | 7½ | 1.84 | 62 | 10.6 | 46.7 | 2.2 | 5.0 |
|  | 4 | 7 | 1.73 | 180 | 10.7 | 29.6 | 2.2 | 4.3 |
|  | 4 | 7 | 1.79 | 220 | 10.7 | 117 | 2.2 | 8.2 |
| Octadecylnaphthalene | 4 | 6 | 1.53 | 66 | 30.3 | 345 | 5.1 | 23.7 |
| Diphenylmethane | 4 | 6½ | 1.62 | 71 | 2.4 | 5.4 | 1.0 | boils |
| 9,10-dihexyl-9,10-dihydroanthracene | 2 | 4 | 0.95 | 134 | 133 | 455 | 9.0 | 17.8 |
| Esters: | | | | | | | | |
| Di (2-ethyl hexyl) sebacate | 1 | 1½ | 0.33 | 66 | 12.9 | 25.8 | 3.4 | 5.4 |
|  | 1 | 1½ | 0.40 | 66 | 13.1 | 31.4 | 3.4 | 6.1 |
|  | 2 | 3½ | 0.84 | 66 | 12.8 | 132.8 | 3.4 | 17.6 |
|  | 2 | 3½ | 0.84 | 67 | 12.8 | 237.8 | 3.4 | 22.6 |
|  | 4 | 5½ | 1.35 | 65 | 12.9 | 438 | 3.4 | 46.0 |
|  | 4 | 6 | 1.53 | 66 | 13.1 | solid | 3.4 | solid |
| Didecyl terephthalate | 1 | 1¾ | 0.43 | 74 | 57.5 | 124.0 | 7.0 | 11.3 |
|  | 4 | 6½ | 1.65 | 74 | 57.4 | 2310 | 7.0 | 77.2 |
| Diethyl adipate | 4 | 5¾ | 1.43 | 68 | 2.4 | 20.3 | 1.0 | 4.2 |
| Polymerized Alkene Oxide: | | | | | | | | |
| Poly (propene oxide)[g] | 1 | ½ | 0.13 | 42 | 57.3 | 80.4 | 9.4 | 11.7 |
|  | 1 | 1½ | 0.36 | 73 | 57.3 | 99.2 | 9.6 | 13.0 |
|  | 1 | 1½ | 0.37 | 73 | 57.3 | 95.0 | 9.6 | 12.7 |
|  | 1 | 1½ | 0.37 | 73 | 57.3 | 99.5 | 9.6 | 13.1 |
|  | 4 | 1½ | 0.41 | 42 | 57.3 | 114.0 | 9.5 | 13.8 |
|  | 1 | 2 | 0.45 | 20 | 57.3 | 139.0 | 9.5 | 16.6 |
|  | 1 | 2 | 0.46 | 134 | 57.3 | 64.8 | 9.6 | 9.2 |
|  | 2 | 4 | 0.94 | 134 | 57.3 | 72.0 | 9.6 | 9.2 |
|  | 3 | 5½ | 1.40 | 134 | 57.3 | 139.0 | 9.6 | 13.5 |
|  | 4 | 6½ | 1.60 | 73 | 57.3 | 196 | 9.6 | 22.5 |
|  | 4 | 6½ | 1.60 | 74 | 57.3 | 232 | 9.6 | 18.7 |
|  | 4 | 6½ | 1.60 | 73 | 57.3 | 438 | 9.6 | 30.1 |
|  | 4 | 7 | 1.70 | 20 | 57.3 | 435 | 9.6 | 27.5 |
|  | 4 | 7 | 1.80 | 134 | 57.3 | 188.0 | 9.6 | 15.3 |
|  | 5 | 8½ | 2.10 | 131 | 57.3 | 334 | 9.6 | 21.3 |
|  | 6 | 10 | 2.50 | 131 | 57.3 | 1215 | 9.6 | 49.9 |
|  | 26 | 33½ | 8.39 | 136 | 57.3 | solid | 9.6 | solid |
|  | [e] 2 | 2 | 0.55 | 66 | 57.3 | 177 | 9.6 | 18.0 |
|  | [e] 5 | 7 | 1.81 | 61 | 57.3 | 538 | 9.6 | 32.9 |
| Ether: | | | | | | | | |
| Dimethoxytetraglycol | 1 | 1½ | 0.36 | 67 | 2.5 | 4.0 | 1.0 | 1.3 |
|  | 4 | 5½ | 1.43 | 67 | 2.5 | 19.3 | 1.0 | boils |
| Halocarbons: | | | | | | | | |
| Polychlorofluoroterphenyl | 4 | 6½ | 1.58 | 68 | 1240 | 1625 | 11.3 | 34.5 |
| Polychlorobenzotrifluoride [low polymer] | 4 | 6½ | 1.60 | 69 | 1.8 | 42.6 | 0.7 | 3.7 |
| Polychlorobenzotrifluoride [high polymer] | 4 | 6½ | 1.60 | 69 | 34.1 | solid | 0.9 | solid |
| Dichlorobiphenyl | 4 | 6½ | 1.62 | 70 | 47.3 | 622 | 1.6 | 6.6 |
| Silicones: | | | | | | | | |
| Dimethyl Silicone | 2 | 3½ | 0.85 | 68 | 282 | solid | 132 | solid |
| Phenyl Methyl Silicone | 1 | 1½ | 0.43 | 65 | 238 | 760 | 32.7 | 80.0 |
|  | 4 | 7 | 1.70 | 65 | 238 | solid | 32.7 | solid |
| Phosphate: | | | | | | | | |
| Tricresyl Phosphate+⅛ inch steel ball | 2 | 3½ | 0.86 | 69 | 39.0 | 960 | 4.6 | 25.4 |
| Ketone: | | | | | | | | |
| Phenyl n-propyl ketone | 1 | 1½ | 0.35 | 120 | 1.8 | 2.1 | 0.8 | 0.9 |
|  | 4 | 6½ | 1.63 | 120 | 1.8 | 14.7 | 0.8 | 2.9 |

[a] Actual time irradiated.
[b] Approximated duration for same dosage if disposed in a reactor suitable for aircraft propulsion, having radiation flux densities of about two orders of magnitude greater—e.g., ca. 7×10¹³ neutrons/cm.²/sec.
[c] Approximated total cumulative neutron dosage sustained.
[d] By-product high-molecular-weight bottoms from commercial detergent alkylbenzene manufacture; technical mixture of straight-, and branched-chain-, aliphatic substituted benzenes of average molecular weight approximating 250.
[e] Plus iron and copper wires to simulate exposure to metals of construction.
[f] Same as [d], but with average molecular weight approximating 350.
[g] 1,2-propene oxide polymerized by conventional method, as by reaction with aliphatic monohydric alcohol, to form long chains of oxypropene radicals linked end-to-end.

gamma radiation; the drill holes in the tops of the cans were exposed in direct communication with streams of air being drawn through the reactor as coolant. The samples were maintained within the operating reactor for differing periods of duration ranging mostly from one to four weeks, and, throughout the irradiation, different groups of samples were retained at different temperature levels representative of those to which the sample would be subjected in functional applications. Upon removal from the reactor, the viscosity of each of the portions was determined both at 100° F. and at 210° F.; similar viscosity measurements were made upon retained portions of the samples in original, unirradiated state. The data obtained, including neutron dosage sustained by each portion at its particular location within the reactor, as a convenient indication of the extent of total dosage of all species of radiation sustained, are presented in comparative fashion in Table II.

The results presented in Table II demonstrate the decided opposition to irradiation-induced thickening, and the extraordinary actual decrease in viscosity upon irradiation, exhibited by the ether-thioether material. As may be noted, all of the other oils became substantially more viscous in the course of the irradiation; to be sure there are two instances in the data on the poly (propene) oxide oil which indicate a slight initial regression to a lower viscosity at 210° F., but these appear as mere isolated deviations from the established general pattern of that oil toward exhibiting the usual thickening under irradiation. It is discernible, too, in the case of the ether-thioether oil that after the initial major viscosity decrease occurring in one-week of irradiation, the viscosity (at 100° F.) resulting from longer irradiation tended to stabilize at about 20 to 25 centistokes.

Although this invention has been described with particular emphasis upon the currently important application to nuclear power plant services, it is inherently of wider applicability. In pursuits other than power generation, wherein such organic oils are unprotectedly disposed in the proximity of nuclear reactors, the instant invention may likewise afford beneficial results. Moreover, aside from nuclear reactors, this procedure may be applied to oppose thickening by the same types of deleterious radiation, especially neutrons and gamma rays, emitted from other conventional radiation sources of the same, such as radium-beryllium neutron sources, and nuclear reactions effected by means of linear accelerators, cyclotrons and the like. Too, while use of the present ether-thioether oil by itself has been stressed, it is possible that further advantage of its viscosity decrease upon irradiation may be realized by mixing the same in appropriate proportions with compatible organic liquids which thicken under irradiation, in the interest of providing composite organic admixtures thereby adapted to retain a virtually constant viscosity upon irradiation. Various additional applications of the hereinbefore-disclosed method will become apparent to those skilled in the art. It is therefore to be understood that all matters contained in the above description and examples are illustrative only and do not limit the scope of the present invention.

Cross reference is made to co-pending applications of the common assignee, directed to methods for similarly opposing such thickening of organic fluids under reactor irradiation, through employment of different agents:

S.N. 380,144, in the names of J. W. Kent, R. O. Bolt, F. A. Christiansen, and G. H. Denison, filed September 8, 1953, for Method of Inhibiting Irradiation-Induced Viscosity Increase of Organic Fluids;

SN. 380,145, in the names of R. O. Bolt, G. H. Denison, J. W. Kent, and F. A. Christiansen, filed September 8, 1953, for Method of Resisting Irradiation-Induced Viscosity Increase of Organic Fluids;

S.N. 380,146, in the names of F. A. Christiansen, G. H. Denison, J. W. Kent, and R. O. Bolt, filed September 8, 1953, now abandoned, for Method of Inhibiting Irradiation-Induced Viscosity Increase of Organic Fluids;

SN. 380,147, in the names of R. O. Bolt, J. G. Carroll, F. A. Christiansen, G. H. Denison, and J. W. Kent, filed September 8, 1953, for Method of Inhibiting Irradiation-Induced Viscosity Increase of Organic Fluids; and S.N. 380,378, in the names of F. A. Christiansen, R. O. Bolt, G. H. Denison, and J. W. Kent, filed September 15, 1953, for Method of Inhibiting Irradiation-Induced Viscosity Increase of Organic Fluids

What is claimed is:

A method for the lubrication of mechanical elements situated in an irradiation flux of an intensity of approximately $0.5 \times 10^{12}$ to $1 \times 10^{12}$ neutrons per square centimeter per second, which comprises lubricating said elements with 16,19-dioxa-13,22-dithiatetratriacontane.

No references cited.